July 8, 1924.
R. R. PAINE
SLOT CLOSER
Filed March 29, 1923
1,500,419
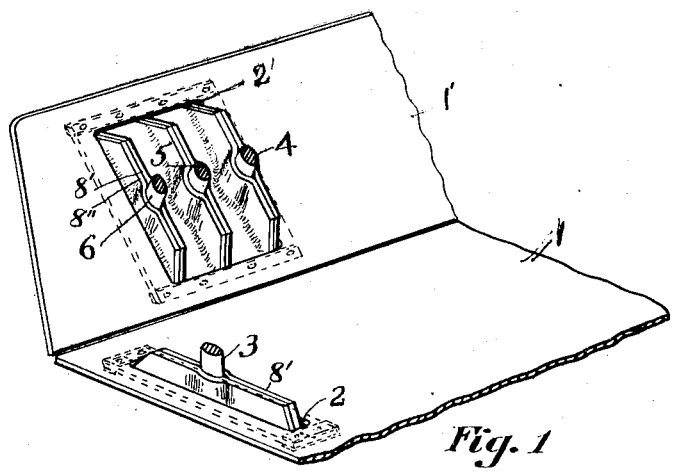
Fig. 1
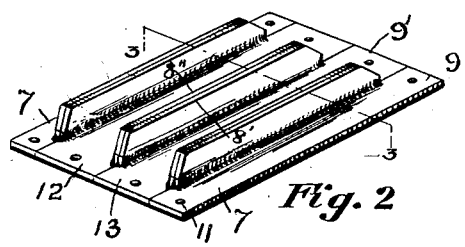
Fig. 2
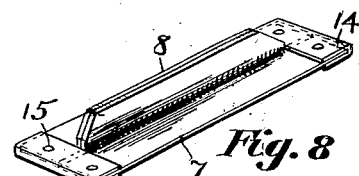
Fig. 8
Fig. 3
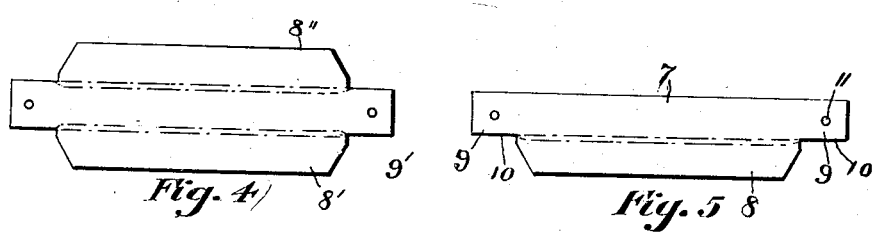
Fig. 4
Fig. 5
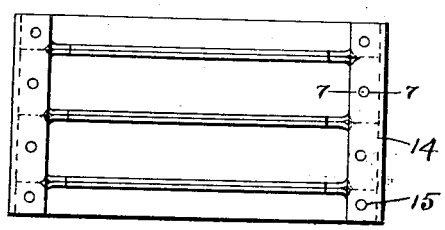
Fig. 6
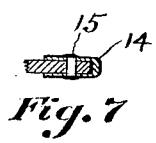
Fig. 7
Inventor.
Roscoe R. Paine
By S. W. Bates
Atty.

Patented July 8, 1924.

1,500,419

UNITED STATES PATENT OFFICE.

ROSCOE RANDALL PAINE, OF WATERVILLE, MAINE.

SLOT CLOSER.

Application filed March 29, 1923. Serial No. 628,607.

*To all whom it may concern:*

Be it known that I, ROSCOE R. PAINE, a citizen of the United States, residing at Waterville, in the county of Kennebec and State of Maine, have invented certain new and useful Improvements in Slot Closers, of which the following is a specification.

My invention relates to a slot closer for automobiles for the purpose of closing up the slots or openings in the floor through which the brakes and levers extend, these slots and openings allowing the dust, mud, etc., to enter and particularly cold air which comes into the interior of the automobile through such openings during cold weather.

Slot closers have been made and applied to automobiles constructed of rubber flanges adapted to close around the slot and around the projecting brake or lever for the purpose of closing the space but all of such devices so far as I am aware were riveted or otherwise permanently fastened to the floor of the machine and their installation required the services of a mechanic for boring holes, etc.

The object of my invention is to produce a self-contained slot closer of the same general character of some of those which have been in use, namely, with pairs of flexible and elastic flanges adapted to fill the slot and extend closely around the projecting brake or lever.

The particular purpose, however, of my invention is to construct such a slot closer cut from rubber sheets or the like and fastened together in such a manner that they will be self-contained, readily handled as a whole and above all, readily placed in position and kept in position by slots in the floor mat corresponding with and superposed upon the slots in the floor.

According to my invention, my slot closer for each projecting lever or arm is formed of two pieces of flat and elastic material as heavy sheet rubber cut out to form a pair of upwardly projecting and contacting flanges to cover the slot and surround the projecting arm or lever, the material composing the flanges being formed to connect with the flat body portion of the device which surrounds the flanges, this device being held in place by the mat and by the edges of the slot formed in the mat to correspond with the slot in the car.

The flat body portion of my device is preferably secured together by metal plates and rivets so that the device is complete and self-contained and can be readily handled as a whole. It can be taken out and put in by being slipped over the projecting brake or lever and held securely in place by the slotted mat in which the slots fit closely around the upwardly projecting flanges of my slot closer, thus holding the structure firmly in place against longitudinal or lateral movement.

Thus, my slot closer may be readily slipped in place by removing the slotted rug, slipping the slot closer over the lever or levers which project up between the contacting flanges and finally holding the slot closer down by putting the mat back in its old position so that the body of the mat presses downward on the body portion of the slot closer and the inner edge of the slots of the mat are in position tending to prevent either longitudinal or lateral movement on the part of the slot closer. The lateral motion is also prevented by the position of the levers bearing against upward extending flanges.

The device being made of sheet rubber or other like material can be readily reversed or turned upside down, the flanges being bent to assume the same relative position as they were before turning so that the device is in effect a quadruple, one being capable of acting in four positions, that with either side turned up or either end reversed, and when worn on one side may be turned over to be worn on the opposite side.

My invention is illustrated in the accompanying drawing which shows my device as applied to a Ford sedan.

In the drawing:—

Fig. 1 is a perspective view of the floor mat as it appears on the floor of the automobile with my device in position, Fig. 2 is a perspective view of my slot closer with the end reinforcing plates omitted, Fig. 3 is a cross section on the line 3—3 of Fig. 2, Fig. 4 is a plan of the flat material as cut out to form one of the interior strips of what I shall term my multiple slot closer, Fig. 5 is a plan of the flat material which forms one side of my single slot closer and the outside member of the multiple slot closer, Fig. 6 is a plan of the multiple slot closer, Fig. 7 is a section on the line 7—7 of Fig. 6 and, Fig. 8 is a perspective view of the single slot closer.

Referring to the drawing, like reference figures indicate like parts in the several figures of the drawing.

In the drawing, 1 indicates the rear portion of the floor mat which contains the single slot 2 and occupies the horizontal portion of the floor of the machine while the forward portion 1' slopes forwardly and upwardly and contains the enlarged slot 2'.

The slot 2 is designed to allow the passage of the emergency brake 3 and the slot 2' is designed to allow the passage of the three operating foot levers 4, 5, and 6 used in the Ford machine.

Referring to the single slot closer, two pieces of flexible elastic material preferably sheet rubber are cut out as shown in Fig. 5, one lateral half 7 of which forms the flat body portion of the completed device and the other half 8 forms one of the upturned flanges for enclosing the projecting arm or lever. The portion 8 is shorter than the body portion 7 whereby a short projection 9 projects from each end. Both of these adjacent projections abut each other and extend across the two ends to hold the strips together and in proper relation to each other to form the body portion of the single slot closer.

In the case of the single slot closer to be applied to the brake 3 two strips similar to 7 are simply placed together side by side abutting the edges 10—10 of the projection 9 and bending upward the portions 8 thereby forming a double upward projecting flange as shown in Figs. 1 and 8.

The two abutting portions of the projection 9 are securely fastened together by a suitable plate 14 preferably a metal plate bent or folded over the edges of the projections 9—9. The metal strips thus extend across the two ends and are secured to the two parts by rivets 15 passing through the rivet holes 11.

This single slot closer is placed in position by slipping it on over the end of the brake lever 3 and causing it to rest on the floor.

The mat is now put in place with the slot completely surrounding the two flanges 8 and preventing either lateral or longitudinal movement of the slot closer.

The arm projecting up through between the flanges 8 which are elastic and flexible will cause these flanges to conform closely to the arm or lever as it moves back and forth in operation and substantially closing the slot against incoming dust or air.

The multiple slot closer as shown in Fig. 2 is made up in a similar manner except that three slots and three levers are provided for instead of one.

The outside member is the same as 7 shown in Fig. 5 with two intermediate members 12 and 13 made up of material cut as in Fig. 4 with upward projecting flanges 8' and 8" and end projections 9'.

The projections 9' of the body portion come in line and correspond with the projection 9 of the side pieces so that the four projections 9 and 9' form a margin extending entirely across the end of the slot closer from side to side and this margin is secured in place by a plate 14 secured to the rubber sheeting by rivets 15 as in the case of the single slot closer.

As thus constructed, the multiple slot closer becomes a self-contained complete device capable of being put in place over the three operating levers and being held in place by the mat 1', the outer edges of the slot 2' fitting over and resting upon the plates 14 and the strips 7, which form the sides of the flat body portion of the multiple slot closer.

The plates 14 are preferably formed as shown in Fig. 7 with U-shaped cross section enclosing both sides of the material and forming a stiff and solid end to both the multiple slot closer and the single slot closer.

It will be seen that the formation of both my single and multiple slot closers is exceedingly simple.

The strips used are cut out in simple patterns from sheet rubber or other like material held together by metal plates readily applied. Instead of metal plates, other means may be used to form the flat body portion which surrounds the flanges.

My slot closer as thus made up is compact and in condition to be sold to users who are able to apply it to their cars without the services of mechanics. It thus becomes a desirable article of commerce capable of being sold by accessory dealers and answering admirably the needs of Ford owners or the owners of other automobiles for which it may be designed.

I claim:—

1. A slot closing device for automobiles and the like including two pieces of flat, elastic and flexible material as sheet rubber cut away to form a pair of upwardly projecting and contacting elastic flanges to cover the slot and surround the operating lever, the material composing the flanges being formed to connect with the lower edge of said flanges with a flat body portion surrounding the slot and a retaining mat having a slot therein fitting around said flanges and resting on said body portion to hold it in place.

2. A slot closing device for automobiles and the like including two pieces of flat elastic and flexible material as sheet rubber, cut away to form a pair of upwardly projecting and contacting flanges to cover the slot and surround the operating lever, the material forming the flanges being formed to connect the lower edges of said flanges with a flat body portion surrounding the slot, metal plates for connecting parts of said body portion and a retaining mat having a slot therein fitting around said flanges and resting upon said body portion to hold it in place.

3. A slot closing device for automobiles and the like including two pieces of flat, elastic and flexible material as sheet rubber, cut away to form a pair of upwardly projecting and contacting flanges to cover the slot and surround the operating lever, the material forming the flanges being formed to connect the lower edges of said flanges with a flat body portion surrounding the slot, metal plates extending across the ends of said slot closer to reinforce said flexible material to form the end portion of the body and a retaining mat having a slot therein fitting around said flanges and resting on said body portion to hold it in place.

4. A slot closing device for automobiles and the like including a plurality of pairs of flat pieces of elastic and flexible material as sheet rubber held side by side, said material cut away to form a plurality of pairs of upwardly projecting and contacting flanges to cover the slot and surround the operating levers, the material forming the flanges being formed to connect the lower edges of said flanges with a flat body portion surrounding the same and a retaining mat having a slot therein fitting around said flanges and resting on said body portion to hold it in place.

ROSCOE RANDALL PAINE.